(12) United States Patent
Ley et al.

(10) Patent No.: US 12,071,000 B2
(45) Date of Patent: Aug. 27, 2024

(54) FUEL CONTAINER FOR A MOTOR VEHICLE AND METHOD FOR PRODUCING SUCH A FUEL CONTAINER, AND REINFORCING ELEMENT FOR A FUEL CONTAINER

(71) Applicant: Kautex Textron GmbH & Co. KG, Bonn (DE)

(72) Inventors: Ingo Ley, Cologne (DE); Frank Quant, Bonn (DE); Detlef Ankert, Bonn (DE)

(73) Assignee: Kautex Textron GmbH & Co. KG, Bonn (DE)

( * ) Notice: Subject to any disclaimer, the term of this patent is extended or adjusted under 35 U.S.C. 154(b) by 267 days.

(21) Appl. No.: 17/416,164

(22) PCT Filed: Dec. 18, 2019

(86) PCT No.: PCT/EP2019/086061
§ 371 (c)(1),
(2) Date: Jun. 18, 2021

(87) PCT Pub. No.: WO2020/127560
PCT Pub. Date: Jun. 25, 2020

(65) Prior Publication Data
US 2022/0072949 A1    Mar. 10, 2022

(30) Foreign Application Priority Data
Dec. 21, 2018    (DE) .................. 10 2018 133 531.8

(51) Int. Cl.
*B60K 15/03* (2006.01)
*B29C 49/20* (2006.01)
*B29C 51/12* (2006.01)

(52) U.S. Cl.
CPC ........ *B60K 15/03177* (2013.01); *B29C 49/20* (2013.01); *B29C 51/12* (2013.01);
(Continued)

(58) Field of Classification Search
CPC ............ B60K 15/073; B60K 15/03177; B29C 49/20; B29C 2049/2017; B29C 2049/2065; B29C 51/12
See application file for complete search history.

(56) References Cited

U.S. PATENT DOCUMENTS

| | | | | |
|---|---|---|---|---|
| 5,660,054 A | * | 8/1997 | Rice | ........................ F24F 1/58 |
| | | | | 312/236 |
| 5,662,468 A | * | 9/1997 | Henderson | ................ F23D 3/26 |
| | | | | 126/96 |

(Continued)

FOREIGN PATENT DOCUMENTS

| | | |
|---|---|---|
| CN | 203690049 U | 7/2014 |
| CN | 103 753 799 B | 4/2017 |

(Continued)

OTHER PUBLICATIONS

17416164-FOR_2021-06-18: Machine translation of CN 103753799(A) Sun et al., Yapp Automotive Parts Co Ltd.*

*Primary Examiner* — Stephen J Castellano
(74) *Attorney, Agent, or Firm* — Occhiuti & Rohlicek LLP

(57) ABSTRACT

Fuel tank for a motor vehicle, —comprising a plastic wall which delimits a storage volume for storing fuel, —comprising one or more reinforcing elements for reinforcing the plastic wall, —with at least one reinforcing element being connected to an outer side of the plastic wall that faces away from the storage volume, characterized in that—a maximum (Continued)

thickness of at least one reinforcing element measured normal to the plastic wall is greater than the wall thickness of the plastic wall.

21 Claims, 13 Drawing Sheets

(52) U.S. Cl.
CPC .............. *B29C 2049/2017* (2013.01); *B29C 2049/2065* (2013.01); *B60K 2015/03375* (2013.01); *B60K 2015/0346* (2013.01); *B60K 2015/03493* (2013.01)

(56) References Cited

U.S. PATENT DOCUMENTS

| | | | |
|---|---|---|---|
| 7,290,675 B2 | 11/2007 | Gombert et al. | |
| 2003/0029093 A1* | 2/2003 | Childress | E05B 15/0205 49/462 |
| 2009/0000686 A1 | 1/2009 | Tsutsumi et al. | |
| 2009/0261107 A1* | 10/2009 | Allgeier | F17C 11/005 220/592.01 |
| 2015/0217635 A1* | 8/2015 | Nakane | B29C 49/20 220/562 |
| 2020/0114754 A1* | 4/2020 | Beysel | B29C 41/46 |

FOREIGN PATENT DOCUMENTS

| | | |
|---|---|---|
| DE | 3445427 A1 | 7/1985 |
| DE | 42 21 766 A1 | 1/1993 |
| DE | 203 18 129 U1 | 2/2004 |
| DE | 10 2010 032 278 A1 | 1/2012 |
| DE | 10 2015 004 704 A1 | 10/2015 |
| DE | 10 2017 006 085 A1 | 1/2019 |
| EP | 1 080 971 A2 | 3/2001 |
| EP | 3 366 459 A1 | 8/2018 |
| JP | H11278066 A | 10/1999 |
| JP | 2005-30371 A | 2/2005 |
| JP | 2007-196493 A | 8/2007 |
| JP | 2009-6858 A | 1/2009 |
| JP | 2014-51215 A | 3/2014 |
| JP | 2016-506331 A | 3/2016 |
| WO | 2009/019375 A2 | 2/2009 |
| WO | 2014131685 A2 | 9/2014 |
| WO | 2017069029 A1 | 4/2017 |

* cited by examiner

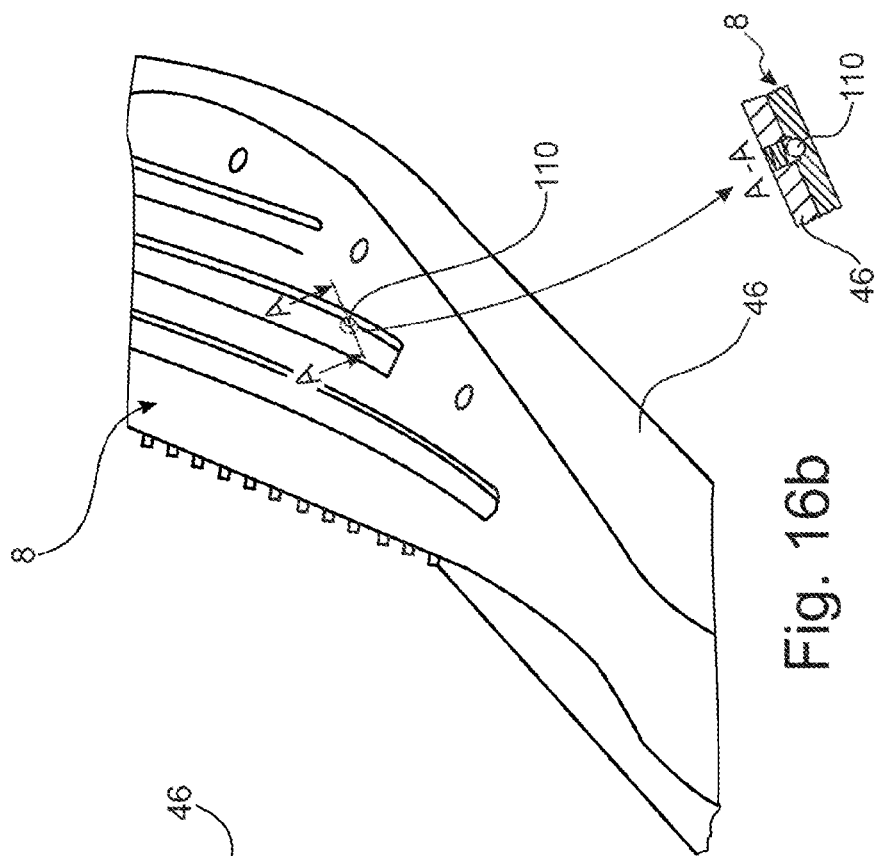
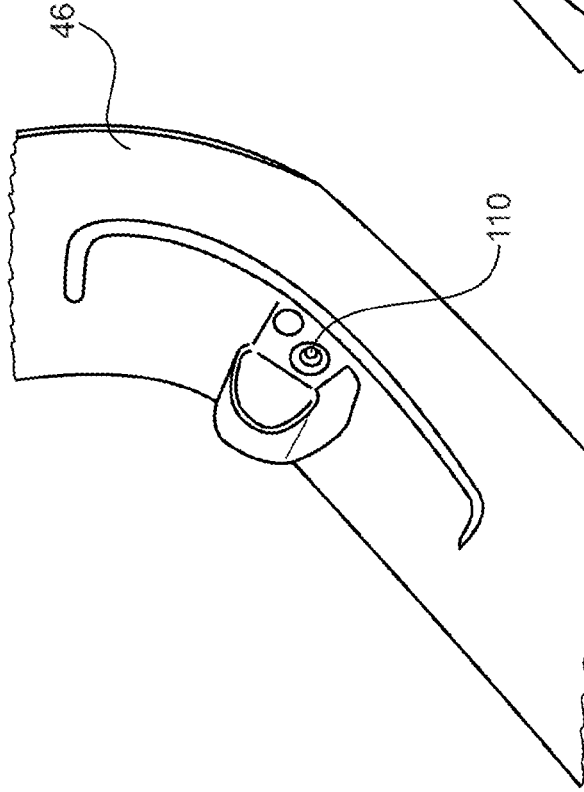
Fig. 16b
Fig. 16a

FUEL CONTAINER FOR A MOTOR VEHICLE AND METHOD FOR PRODUCING SUCH A FUEL CONTAINER, AND REINFORCING ELEMENT FOR A FUEL CONTAINER

CROSS-REFERENCE TO RELATED APPLICATIONS

This application is a national phase under 35 U.S.C. 371 of International Application No. PCT/EP2019/086061 filed on Dec. 18, 2019, which claims priority to German Application No. 2018 133 531.8 filed on Dec. 21, 2018, the contents of all of which are hereby incorporated by reference in their entireties.

The present invention relates to a fuel tank for a motor vehicle, comprising a plastic wall that delimits a storage volume for storing fuel, comprising one or more reinforcing elements for reinforcing the plastic wall, with at least one reinforcing element being connected to the plastic wall with an outer side facing away from the storage volume. The invention further relates to a method for producing such a fuel tank and to a reinforcing element for a fuel tank.

Fuel tanks of motor vehicles are used to reliably and safely store fuel for an internal combustion engine. Modern fuel tanks are usually made of plastic for reasons of weight. In particular in hybrid vehicles, in which the fuel tank is sealed during purely electric travel in order to preclude emissions, significant deformations of the tank walls can occur due to pressure fluctuations within the tank, with it being possible to have deformations of up to 25 mm of the wall in question from its nominal position. However, vehicle manufacturers require deformations of 10 mm or less in order to keep the installation space required for integrating the fuel tank into the overall vehicle small.

It is known to provide tank stiffening elements within the storage volume as struts extending between two half-shells of the tank wall. However, this solution is disadvantageous in that the internal stiffening elements result in a considerable reduction in the storage volume provided for storing fuel. It has also been shown that this type of wall reinforcement for use in hybrid vehicles with temporarily sealed fuel tanks does not meet the requirements for the maximum permissible deformations of 10 mm or less.

Against this background, the invention is based on the technical problem of providing a fuel tank of the type mentioned at the outset and a method for producing a fuel tank which do not have the aforementioned disadvantages or have them at least to a lesser extent, and which allow in particular reliable reinforcement with less loss of volume.

According to a first aspect, the invention relates to a fuel tank for a motor vehicle, comprising a plastic wall that delimits a storage volume for storing fuel, comprising one or more reinforcing elements for reinforcing the plastic wall, with at least one reinforcing element being connected to an outer side of the plastic wall that faces away from the storage volume. A maximum thickness of at least one reinforcing element measured normal to the plastic wall is greater than the wall thickness of the plastic wall.

Compared to previously known solutions, the outer reinforcement with a local thickening of the wall structure by the reinforcing element allows reliable reinforcement of the plastic wall with less loss of volume.

For example, the maximum thickness of at least one reinforcing element corresponds to at least twice, three times, four times, ten times or twenty times the wall thickness of the plastic wall. In particular, the reinforcing element has a maximum thickness selected from a range between 10 mm and 100 mm inclusive.

According to a further embodiment of the fuel tank, the plastic wall has a first half-shell and a second half-shell which are circumferentially welded to one another in the region of a side wall, the first half-shell being an upper shell which comprises a tank top and the second half-shell being a lower shell which comprises a tank bottom, with at least one reinforcing element being arranged in a transition from the side wall to the tank top and/or at least one reinforcing element being arranged in a transition in front of the side wall to the tank bottom.

This allows targeted reinforcement in a transition of the side wall to a tank bottom and/or to the tank top so that, in the case of pressure changes, both a deformation of the side wall and a deformation of the tank bottom and/or the tank top can be reduced.

According to a further embodiment of the fuel tank, at least one reinforcing element is tapered on two sides starting from a region of maximum thickness and in particular has a substantially triangular or crescent-shaped basic shape. The reinforcing element can therefore be formed in particular in the manner of a reinforcing bracket, for example to provide targeted reinforcement in a transition from the side wall to a tank bottom and/or to the tank top.

According to a further embodiment of the fuel tank, the reinforcing element has at least one tapered end portion which in particular has a thickness of 5 mm or less over an end portion length of 20 mm or less and is in particular tapered in a wedge shape. Tapering as described above allows an improved connection of the reinforcing element to the plastic wall, since, under load, the notch effect or load peaks in the connection region to the plastic wall can be reduced.

A tapered end portion can have a rounded shape. As an alternative or in addition, the end portion can have a flattened region which is wider than the middle portion adjoining the end portion. As an alternative or in addition, the tapered end portion can be branched in the shape of a fork. As an alternative or in addition, the tapered end portion can have a through-opening.

A further embodiment of the fuel tank is characterized in that an end connection region of at least one reinforcing element is at least partially or completely arch-shaped, the reinforcing element being connected to the plastic wall in the connection region in particular in an integrally bonded manner. The reinforcing element can therefore be adapted to a wall shape of the fuel tank.

In particular, a transition from the side wall to a tank bottom and/or a transition from the side wall to the tank top, viewed in cross section, can be designed to be arch-shaped. In this way, a soft transition with reduced notch effects can be created. In particular, an end connection region of a reinforcing element can abut an arch-shaped transition of the plastic wall in particular without a gap, or can be connected to such an arch-shaped transition of the plastic wall without a gap and in an integrally bonded manner.

According to a further embodiment of the fuel tank, it is provided that at least one reinforcing element is an injection-molded component with ribbing. In this way, a stiff reinforcing element with a lower weight can be provided inexpensively.

Alternatively or in addition, at least one reinforcing element has a plurality of welding pins which are arranged in particular on an end face and/or on a side surface of the reinforcing element that adjoins the end face. The welding pins improve an integral bond to the plastic wall and can be partially or completely fused with a material of the plastic wall. Before an integral bond to the plastic wall is established, the welding pins can be an integral part of a reinforcing element provided in particular in one piece as an injection-molded component.

A further embodiment of the fuel tank is characterized in that at least one reinforcing element is connected on three sides to the plastic wall, with in particular an end face and two side flanks which adjoin the end face and face away from one other being integrally bonded to the plastic wall. The reinforcing element can therefore be bordered or enclosed on three sides by the plastic wall, so that a reliable connection is formed between the reinforcing element and the plastic wall.

In particular, an integral bond can be formed between the reinforcing element and the plastic wall in the region of each of the three sides, so that an integral bond is formed between the end face and the reinforcing element and an integral bond is formed between each of the side flanks and the plastic wall. In particular, the integral bonds of the side flanks to the plastic wall can merge seamlessly into the integral bond of the end face to the plastic wall.

A further embodiment of the fuel tank is characterized in that at least one form-fitting connection is formed between at least one reinforcing element and the plastic wall, in particular in the region of an undercut, a groove or the like. In particular, it can be provided that an integral bond to the plastic wall is formed in the region of an end face of a reinforcing element, and an integral bond and a form-fitting connection to the plastic wall is formed, respectively, in the region of two side flanks of the reinforcing element which adjoin the end face and face away from one another. In this way, the reinforcing element can be reliably integrated into the plastic wall in order to strengthen it structurally.

According to a further embodiment of the fuel tank, it is provided that at least one reinforcing element comprises HDPE or consists of HDPE. The abbreviation HDPE stands, as is known, for "high-density polyethylene," in particular with a density in a range of from $0.94$ g/cm$^3$ to $0.97$ g/cm$^3$. In this way, an inexpensive reinforcing element that is particularly easy to weld can be specified.

In particular, an identical integral bond is formed between a reinforcing element and the plastic wall, with the reinforcing element being made of HDPE, for example, and being welded to HDPE of the plastic wall.

Alternatively, the reinforcing element can comprise LDPE or consist of LDPE. The abbreviation LDPE stands, as is known, for "low-density polyethylene," in particular with a density in a range of from $0.915$ g/cm$^3$ to $0.935$ g/cm$^3$.

Alternatively, the reinforcing element can comprise a fiber-reinforced plastic or consist of a fiber-reinforced plastic. For this purpose, short fibers, long fibers or continuous fibers can be used as reinforcing fibers.

For example, glass fibers, aramid fibers or plastic fibers can be used.

Alternatively, the reinforcing element can comprise a mixed material, a so-called blend, or consist of a mixed material. This can be, for example, material mixture of PE (polyethylene) with PA (polyamide) or PE (polyethylene) with POM (polyoxymethylene).

The plastic wall can be formed in one, two or more layers. For example, the plastic wall can have an EVOH barrier layer as a diffusion barrier for hydrocarbons, which is bordered on two sides by HDPE layers, resulting in a three-layer wall structure. Alternatively, an LDPE layer can be arranged as an adhesion promoter layer between the EVOH barrier layer and the HDPE layers arranged on two sides, resulting in a five-layer wall structure. The abbreviation "LDPE" stands for "low-density polyethylene." The abbreviation "EVOH" stands for "ethylene vinyl alcohol copolymer."

According to a further embodiment of the fuel tank, at least one reinforcing element is embedded in a recess or depression in the plastic wall. In this way, the reinforcing element can be compactly integrated into the installation space of the fuel tank.

Alternatively or in addition, it can be provided that a height of the fuel tank measured between a tank top and a tank bottom of the fuel tank is 30 cm or more. The reinforcement provided the therefore allows fulfillment of manufacturer specifications for the maximum deflection of wall regions from their nominal position, even for fuel tanks of which the height is 30 cm or more.

It can be provided that a plurality of reinforcing elements is provided on the plastic wall. If the plastic wall has, for example, two half-shells, in particular an upper shell and a lower shell, a plurality of reinforcing elements can be provided on the upper shell and, alternatively or in addition, a plurality of reinforcing elements can be provided on the lower shell. Each of the reinforcing elements can be designed in the manner described above.

As an alternative or in addition to welding, the reinforcing element can be connected to the plastic wall in a form-fitting manner. In this case, projecting shaped elements of the reinforcing element with undercuts can be enclosed by the plastic wall and/or penetrate it during the shaping of the plastic wall in the shaping heat, so that, in the cooled state, a non-destructively detachable, form-fitting connection is formed between the plastic wall and the shaped elements. As an alternative or in addition, openings can be formed in the reinforcing element, into which openings the material of the plastic wall penetrates and engages from behind during the shaping of the plastic wall, so that, in the cooled state, a non-destructively detachable, form-fitting connection is formed between the plastic wall and the openings.

In this way, material combinations of the reinforcing elements and the plastic wall which are not or are only poorly weldable can also be reliably interconnected. For example, the plastic wall can comprise HDPE, while the reinforcing element comprises POM, PA, a duromer or PE, which cannot be welded to the HDPE of the plastic wall or is difficult to weld thereto. For example, the reinforcing element can comprise e.g. brittle materials that break in the event of a crash before the plastic wall is damaged.

The reinforcing element can be produced in a two-component design and can have at least two different materials which are interconnected in an integrally bonded and/or form-fitting and/or force-locking manner. This can be a combination of two plastics or a plastic with a metal in order to adapt the stiffness of the reinforcing element to the static and dynamic operating loads to be expected.

A reinforcing element can be optimized with regard to its weight and/or stiffness by means of a computer-aided simulation.

A reinforcing element can have one or more reinforcing ribs.

A reinforcing element can have one or more reinforcing ribs that are interrupted and/or can have sub-regions that have no ribs.

According to a second aspect, the invention relates to a method for producing a fuel tank, specifically a fuel tank according to the invention, comprising the following method steps:

Producing a plastic wall which delimits a storage volume for storing fuel, by introducing a plasticized plastic a molding tool;

Connecting one or more reinforcing elements for reinforcing the plastic wall to the plastic wall, the reinforcing elements being arranged on the molding tool before the plasticized plastic is introduced into the molding tool in such a way that at least one reinforcing element is connected to an outer side of the plastic wall that faces away from the storage volume, with a maximum thickness of at least one reinforcing element measured normal to the wall corresponding to a multiple of the wall thickness of the plastic wall.

In this way, a fuel tank can be produced of which the outer reinforcement with a local thickening of the wall structure by the reinforcing element allows reliable reinforcement of the plastic wall with less volume loss compared to previously known solutions.

According to a further embodiment of the method, it is provided that the molding tool is a blow mold and at least one reinforcing element is connected to the plastic wall in an integrally bonded and/or form-fitting manner by blowing over said element within the blow mold. For example, preforms for the production of two half-shells of the plastic wall can be provided a co-extruded, longitudinally split tubular material, and are formed within a blow mold by applying internal pressure. An integral bond, in particular welding, of the reinforcing element or multiple reinforcing elements to the plastic wall can take place in particular in the shaping heat of the preforms. Alternatively, it can be provided that a preform is a co-extruded tube which is connected on the outside to one or more reinforcing elements by applying internal pressure.

It can be provided that at least one reinforcing element has a plurality of welding pins or welding ridges on an end face and/or on a side flank which adjoins the end face in order to form an integral bond to the plastic wall when the plasticized plastic is introduced into the molding tool, the welding ridges being distributed in particular in a grid-like manner or the welding pins being provided in a punctiform manner in rows and columns at a connection region.

Alternatively or in addition, it can be provided that at least one reinforcing element has a groove, an undercut or a projection in order to provide a form-fitting connection to the plastic wall when the plasticized plastic is introduced into the molding tool.

It can be provided that at least one reinforcing element is connected to the plastic wall on three sides, with in particular an end face and two side flanks which adjoin the end face and face away from one another being integrally bonded to the plastic wall, and the reinforcing element, before the plasticized plastic is introduced, being seated on a mandrel or ridge of the molding tool which protrudes into the reinforcing element and is bordered on two sides by the side flanks and is at least partially delimited from a mold cavity of the molding tool. In this way, compact integration of the reinforcing element into the plastic wall can be achieved.

A further embodiment of the method is characterized in that at least one reinforcing element is connected to the plastic wall on three sides, with in particular an end face and two side flanks which adjoin the end face and face away from one another being integrally bonded to the plastic wall, and the reinforcing element, before the plasticized plastic is introduced, being received between two mold inserts and the mold inserts at least partially delimiting the reinforcing element from a mold cavity of the molding tool.

According to an expedient embodiment, it is proposed that the reinforcing element is fixed on the molding tool with a latching element during the introduction into the molding tool.

A latching element is understood to mean an element which is designed to be able to form a form-fitting and/or force-locking connection between the molding tool and the reinforcing element.

It can advantageously be achieved in this way that the reinforcing element can be held and/or fixed by means of a latching element after the introduction into the molding tool. Due to the connection provided in this way, the reinforcing element can preferably not slip within the molding tool after latching with the molding tool by means of the latching element, so that the shape and position tolerances of the fuel tank produced can advantageously be improved overall.

A latching element is preferably designed as a pressure piece, in particular as a resilient pressure piece.

A resilient pressure piece is a machine component which has an internal spring which acts on a pressure body, in particular a ball and/or a pressure pin.

In this way, a reinforcing element can advantageously be securely fastened within the molding tool in a simple manner, while at the same time being easily detachable again for demolding the molded fuel tank.

Alternatively, a latching element can also be understood to mean a clipping means. In particular, a clipping means should be considered which is formed in particular on the reinforcing element and is designed to engage in the molding tool and establish a form-fitting and/or force-locking connection between the molding tool and the reinforcing element.

In this way, it can advantageously be achieved that the mounting of a reinforcing element on the molding tool can be simplified and, at the same time, can also be carried out in a way that is less susceptible to maintenance.

Alternatively, the clipping means can also be formed in the molding tool.

It should be expressly noted that the subject matter of the second aspect can advantageously be combined with the subject matter of the preceding aspect of the invention, both individually or cumulatively in any combination.

It should be expressly noted that the latching element proposed here can also be used for other applications within a molding tool.

According to a third aspect, the invention relates to a reinforcing element for a fuel tank, in particular for a fuel tank according to the first aspect of the invention, the reinforcing element having at least one blind hole which is designed to be gripped with a gripper.

In particular, it is also conceivable that the reinforcing element has at least two blind holes which are designed to be gripped with a gripper.

The blind holes are preferably formed in such a way that they are arranged on the side of the reinforcing element which is designated to come into contact with the plastic wall of the fuel tank.

In other words, the blind holes are preferably oriented in such a way that they are oriented toward the inside of the cavity of the molding tool when the reinforcing element is introduced and/or latched into the molding tool.

A gripper can thus grip a reinforcing element by means of the blind holes and insert the reinforcing element into the molding tool.

A blind hole preferably has an undercut, which advantageously allows a form-fit between the gripper and the reinforcing element.

It should be expressly noted that the subject matter of the third aspect can advantageously be combined with the subject matter of the preceding aspects of the invention, both individually or cumulatively in any combination.

The invention is described in greater detail in the following with reference to drawings showing embodiments, in which, schematically:

Figure 10A:
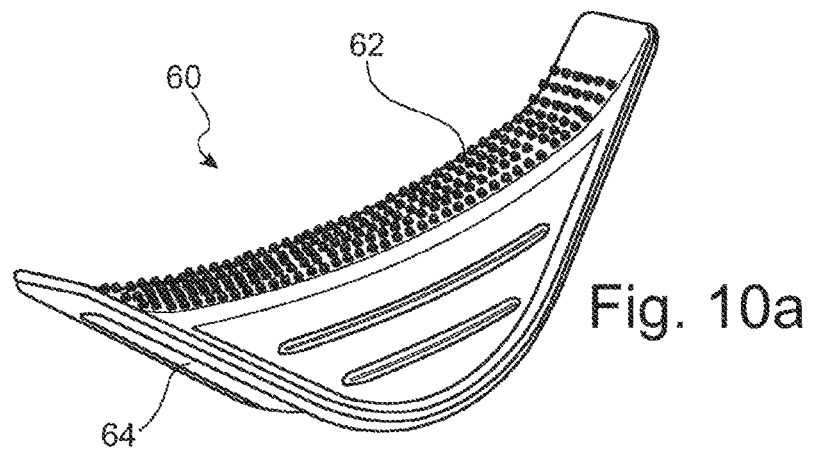
FIG. 10a shows a further reinforcing element.
Figure 10B:
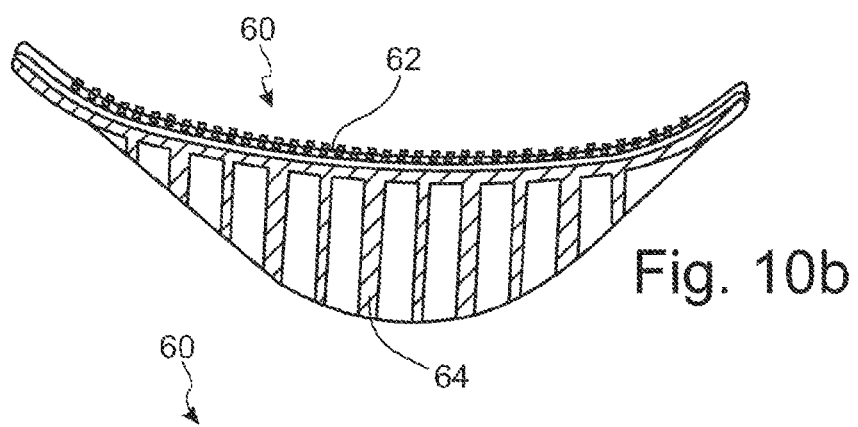
Figure 10C:
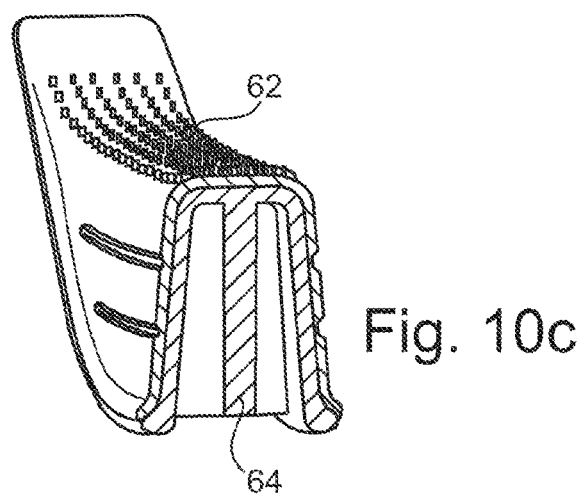
Figure 11A:
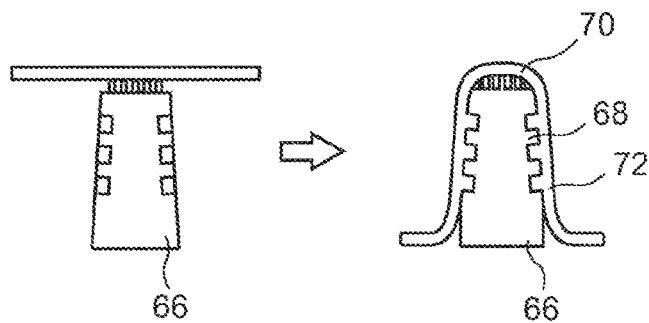
Figure 11B:
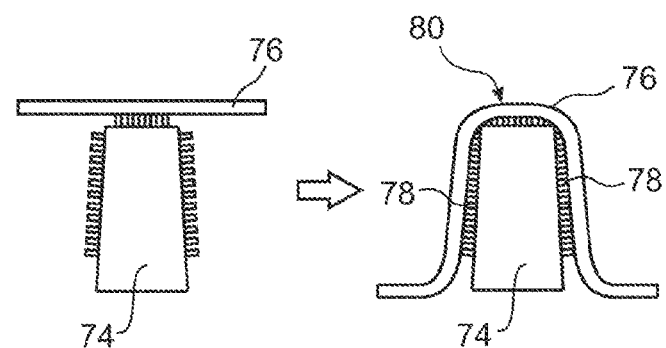
Figure 11C:
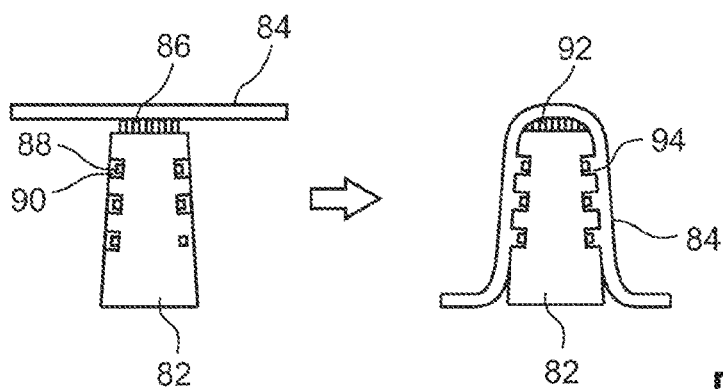
Figure 12:
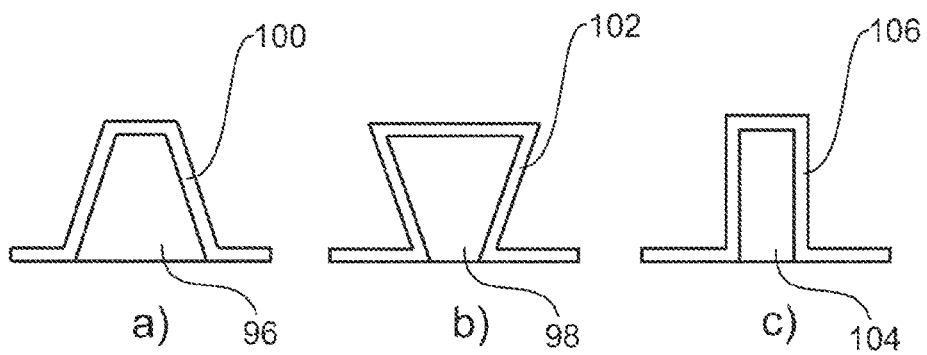
Figure 13:
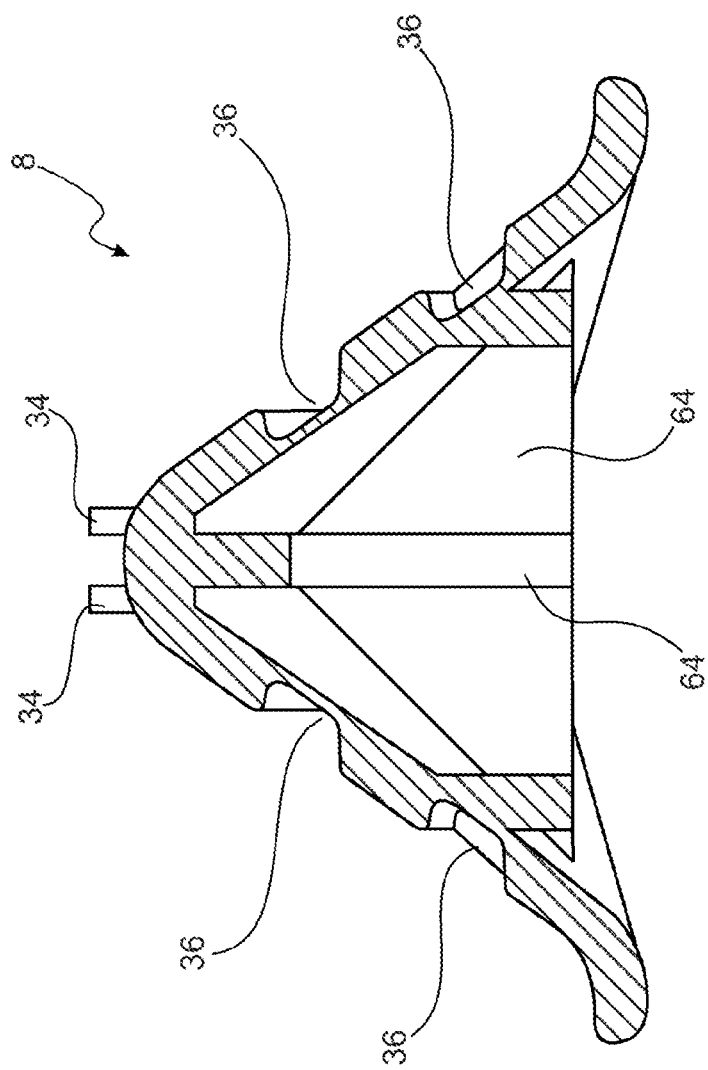
Figure 14:
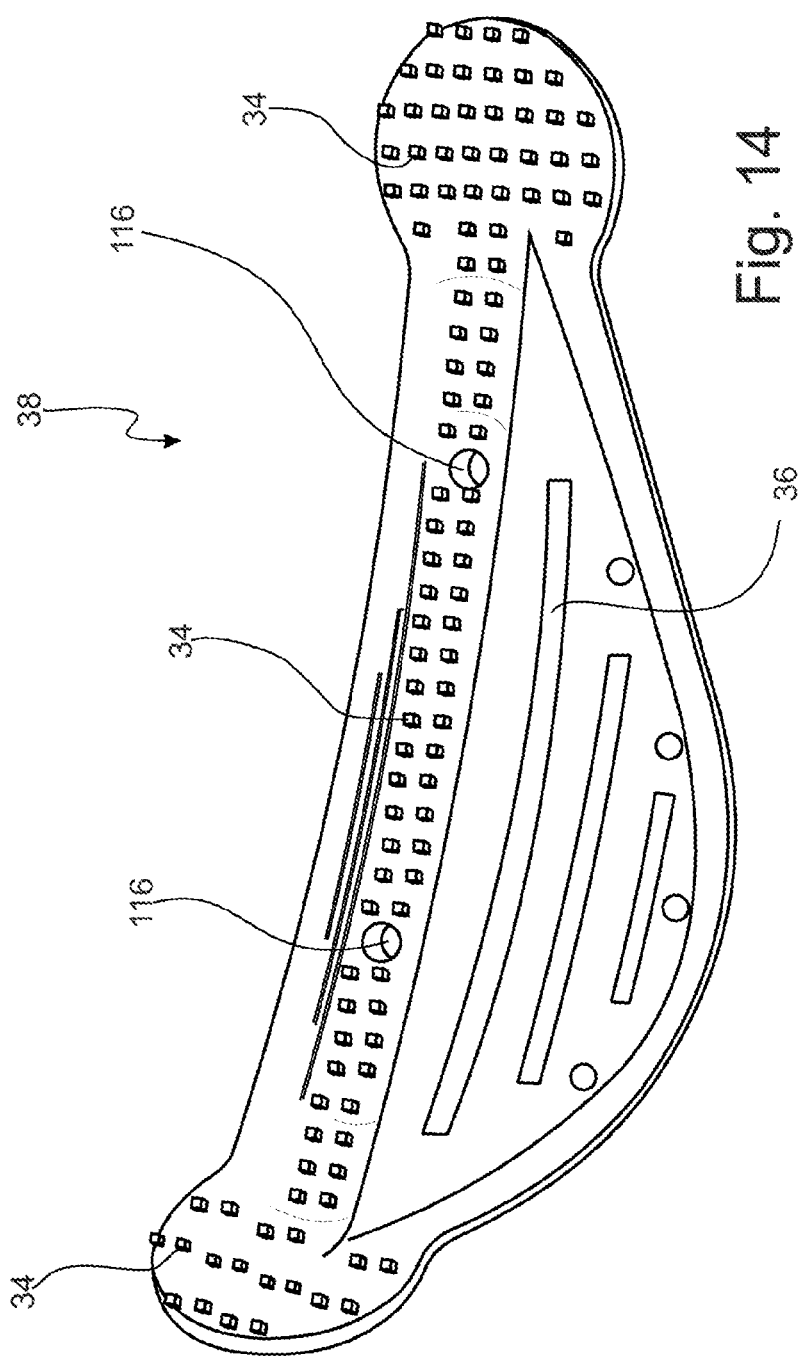
Figure 15:
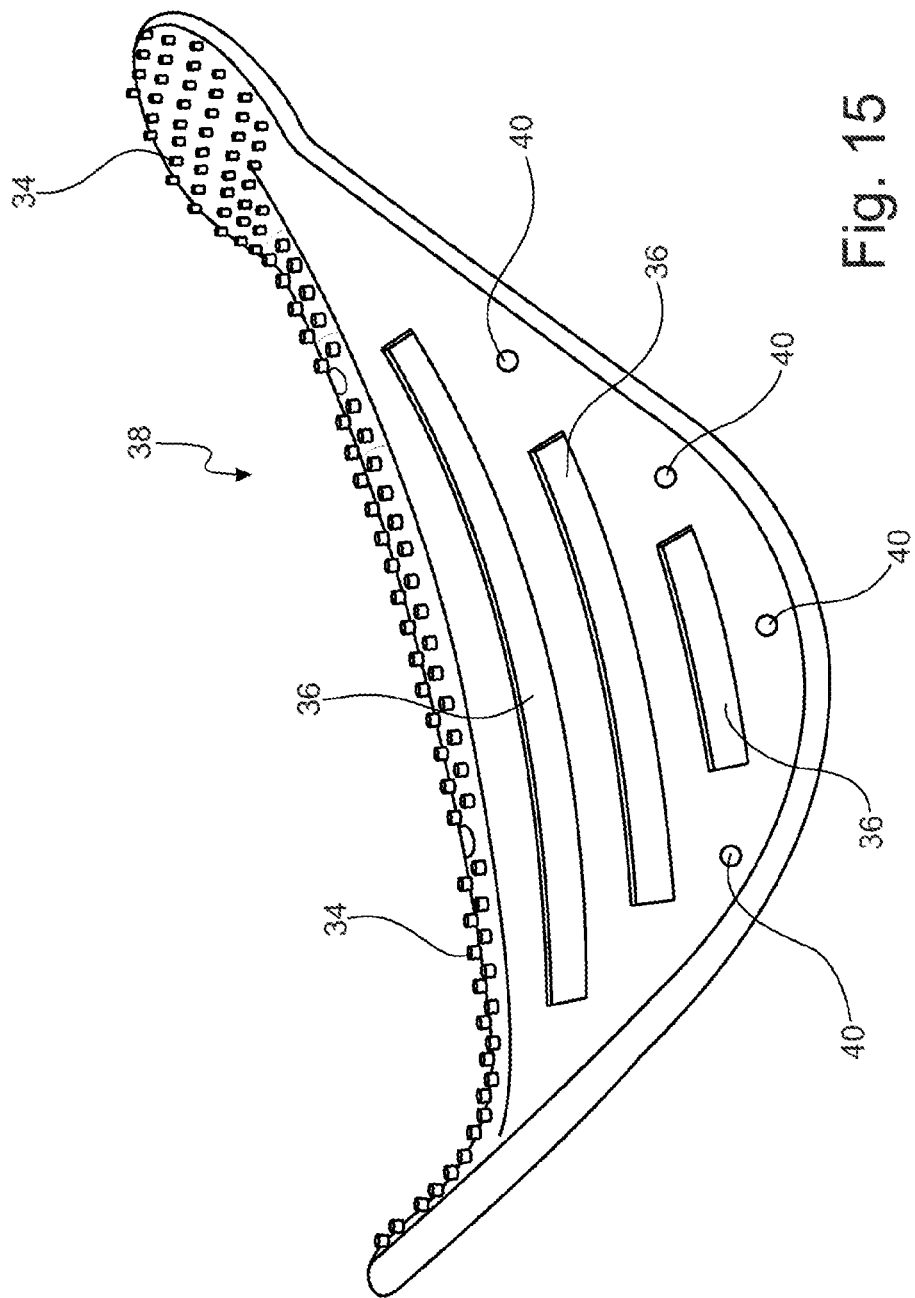

FIG. 10b schematically shows the reinforcing element from FIG. 10a in a first section;

FIG. 10c schematically shows the reinforcing element from FIG. 10a in a second section;

FIG. 11a shows a first connection variant of reinforcing elements to the plastic wall;

FIG. 11b shows a second connection variant of reinforcing elements to the plastic wall;

FIG. 11c shows a third connection variant of reinforcing elements to the plastic wall;

FIG. 12 shows cross-sectional shapes of reinforcing elements;

FIG. 13 shows a further reinforcing element in section;

FIG. 14 shows a further reinforcing element;

FIG. 15 shows a further reinforcing element;

FIG. 16a shows a detailed view of a molding tool with a latching element; and

FIG. 16b shows a reinforcing element fixed in a molding tool.

Figure 1:
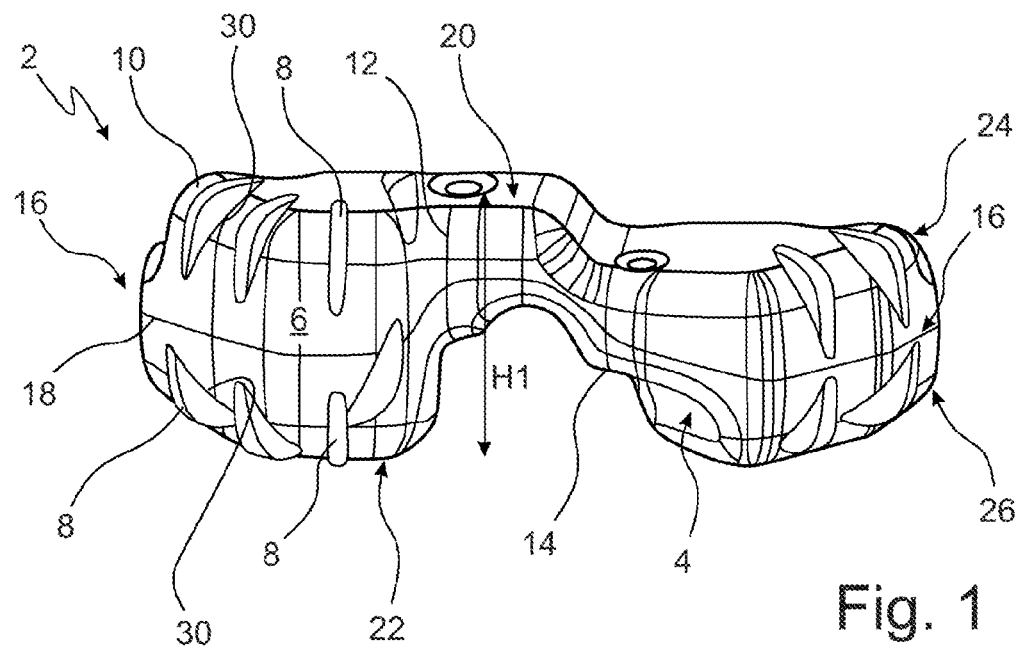
FIG. 1 shows a fuel tank according to the invention.

FIG. 1 shows a fuel tank 2 for a motor vehicle. The fuel tank 2 has a plastic wall 4 which delimits a storage volume 6 for storing fuel.

The plastic tank 2 has a plurality of reinforcing elements 8 for reinforcing the plastic wall 4. The reinforcing elements 8, of which only three are provided with a reference sign by way of example, are connected to an outer side 10 of the plastic wall 4 that faces away from the storage volume 6. A maximum thickness D1 of approx. 45 mm of the respective reinforcing elements 8, measured normal to the plastic wall 4, is greater than the wall thickness D2 of the plastic wall 4.

The plastic wall 4 has a first half-shell 12 and a second half-shell 14. The half-shells 12, 14 are circumferentially welded along a weld seam 18 in the region of a side wall 16 of the plastic wall 4.

The first half-shell 12 is an upper shell which comprises a tank top 20. The second half-shell 14 is a lower shell which comprises a tank bottom 22. A plurality of the reinforcing elements 8 are each arranged in an arch-shaped transition 24 from the side wall 16 to the tank top 20 or in an arch-shaped transition 26 from the side wall 16 to the tank bottom 22.

Figure 2:
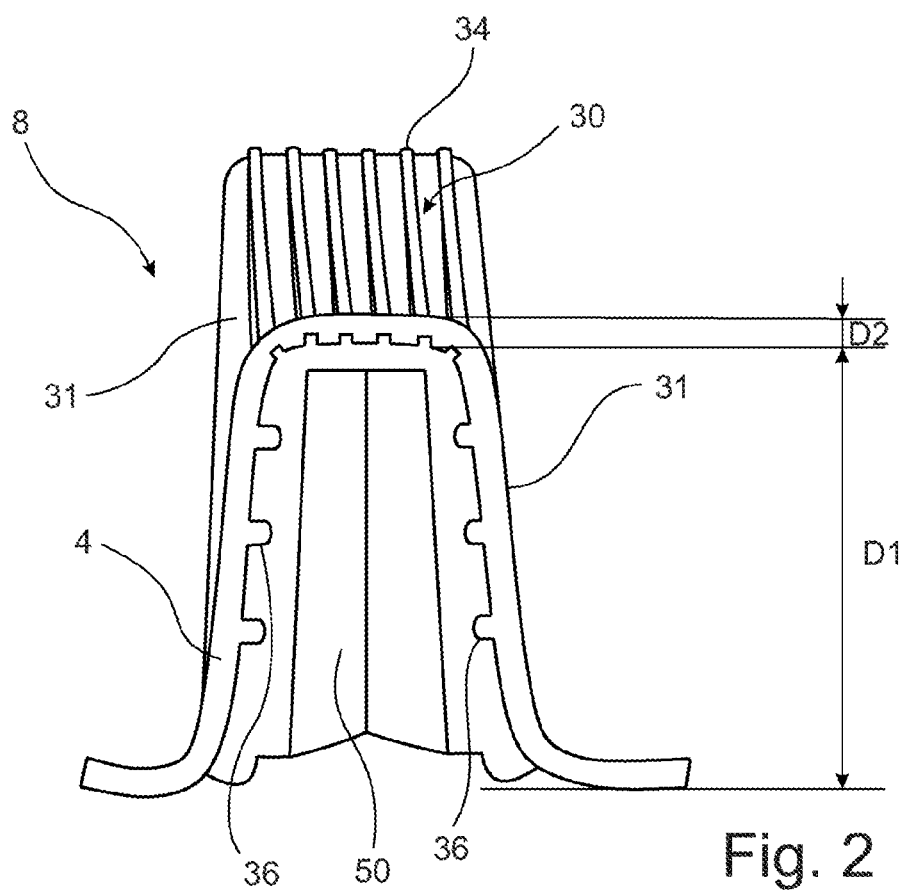
FIG. 2 shows a reinforcing element on a plastic wall.
Figure 3A:
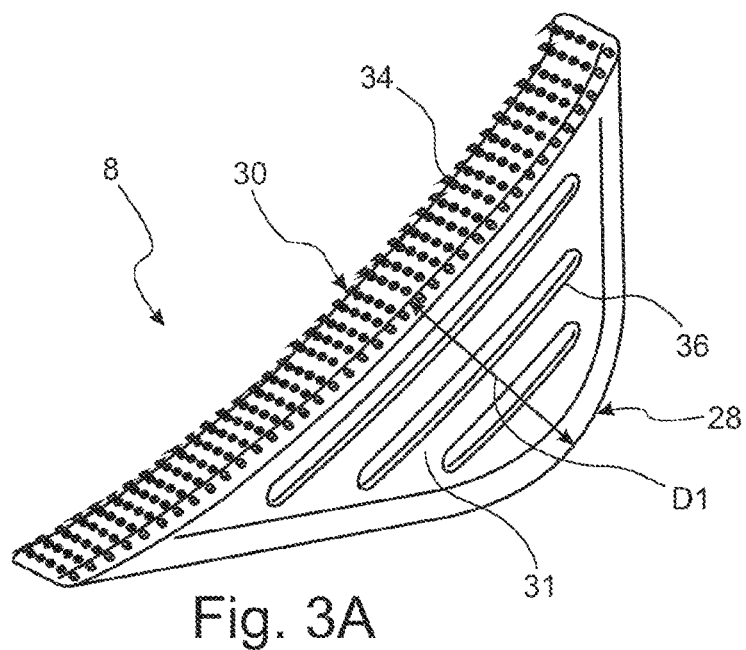
FIG. 3A shows a reinforcing element.
Figure 3B:
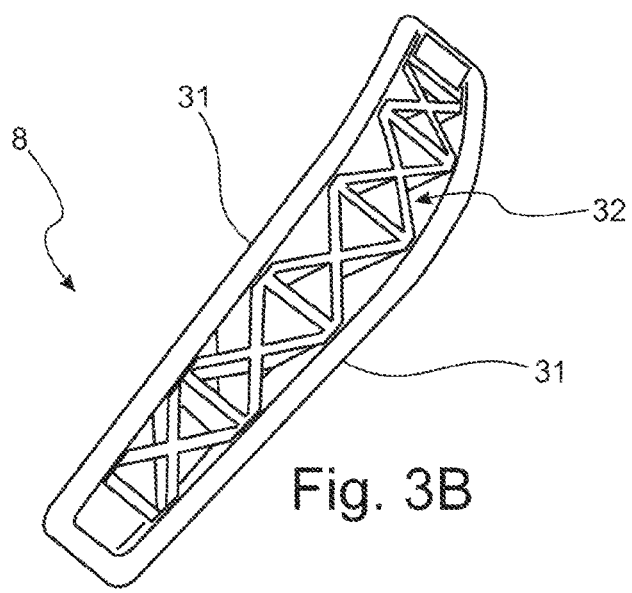
FIG. 3B shows the reinforcing element from FIG. 3A in a rear view.

FIGS. 3A and 3B show the reinforcing element 8 from FIGS. 1 and 2 individually in a perspective view from the front (FIG. 3A) and a perspective view from the rear (FIG. 3B).

The reinforcing element 8 is tapered on two sides starting from a region 28 of maximum thickness D1 and has a substantially crescent-shaped or moon-shaped basic shape. An end connection region 30 with which the reinforcing element 8 is welded to the plastic wall at the end is arch-shaped. In the present case, the reinforcing element 8 is designed as an injection-molded component and has ribbing 32. A plurality of welding pins 34 are arranged in rows and columns on the end face 30 of the reinforcing element 8, which pins serve to establish an integral bond to the plastic wall 4.

As an alternative or in addition to the punctiform welding pins, a grid-like or lattice-like ridge structure can be provided for establishing the integral bond according to further embodiments.

As shown in FIG. 2, the reinforcing elements are each connected to the plastic wall 4 on three sides, with, on the one hand, the end face 30 and, in addition, two side flanks 31 which adjoin the end face 30 and face away from one another being integrally bonded to the plastic wall 4.

Furthermore, grooves 36 are provided in the reinforcing element 8 in order to establish a form-fitting connection. The grooves 36 are molded into the side flanks 31 of the reinforcing element 8 and, like the welding pins 34, have been formed in one piece on the reinforcing element 8 by injection molding. The reinforcing elements 8 in the present case consist of HDPE.

As can be seen from FIG. 2, the reinforcing elements 8 are embedded in the plastic wall 4, so that the reinforcing elements 8 each sit in a recess or depression in the plastic wall 4.

A height H1 of the fuel tank 2 measured between the tank top and the tank bottom 22 is more than 30 cm in the present case.

Figure 4:
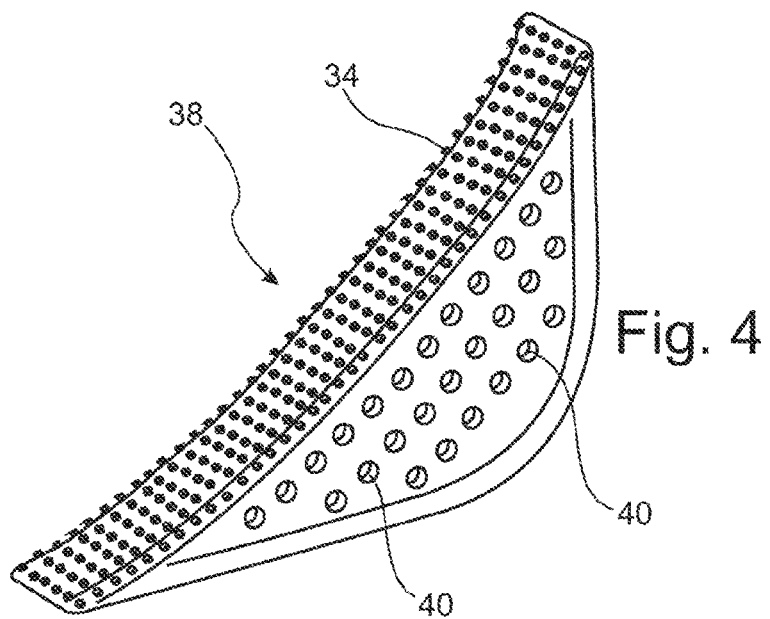
FIG. 4 shows a further reinforcing element.

FIG. 4 shows a variant of a reinforcing element 38 for a fuel tank 2 according to the invention, which can be provided on the plastic wall 4 as an alternative or in addition to the reinforcing elements 8.

The reinforcing element 38 differs from the previously described reinforcing element 8, which is provided with depressions 40 in the region of the side flanks, such that, in the state fastened to the wall 4, there are knob-like form-fitting connections to the plastic wall 4 of the fuel tank 2.

These knob-like form-fitting connections are advantageous in that they are particularly suitable for absorbing a force between the fuel tank and the reinforcing element, as a result of which additional stiffening of the fuel tank can be effected.

A depression 40 can preferably be designed as a through-hole, resulting in a form-fitting connection to the plastic wall 4 of the fuel tank 2 in the state fastened to the wall 4.

Particularly preferably, a depression 40 with at least two different diameters can be formed. In particular, an advantageous embodiment is specifically conceived in which the larger diameter of the depression 40 is arranged on the designated side facing away from the wall 4, resulting in a form-fitting connection to the plastic wall 4 of the fuel tank 2 in the state fastened to the wall 4, which preferably has an undercut due to the different diameters of the depression 40.

Such an undercut is particularly robust in the axial direction of the depression 40.

A further advantage of a depression 40 designed as a through-hole is that it can be used as a vent during the blow molding process, so that the plasticized plastic can optimally penetrate into the depression 40 designed as a through-hole without counter pressure.

Alternatively, welding pins or knobs or ridge structures can equally be provided in the region of the side flanks in order to promote a form-fitting connection and an integral bond to the plastic wall.

Figure 5:
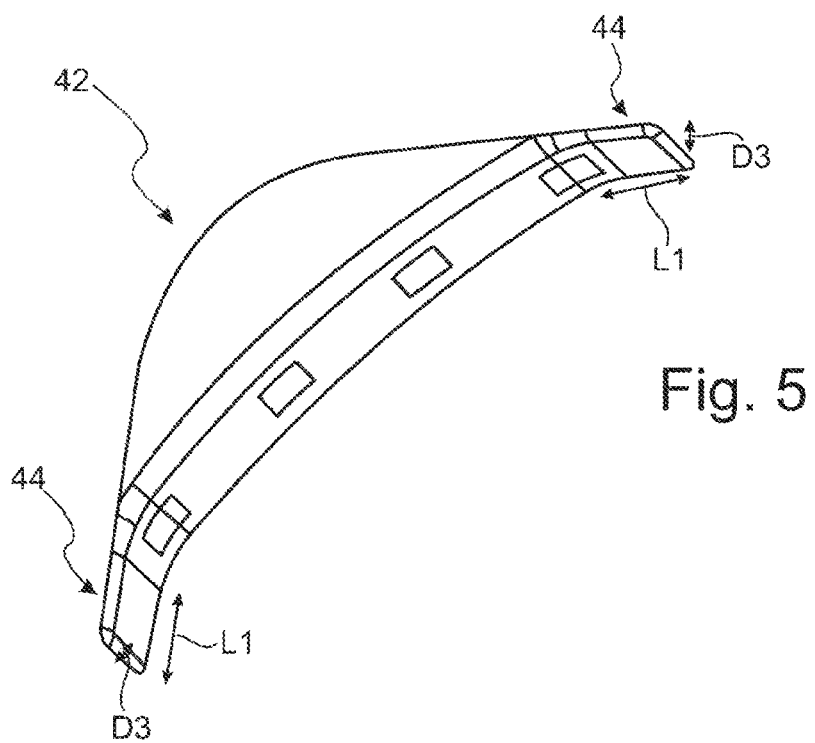
FIG. 5 shows a further reinforcing element.

FIG. 5 shows a further embodiment of a reinforcing element 42, which can be provided as an alternative or in addition to the reinforcing elements 8 and/or 38 on the liquid tank 2 according to the invention in order to reinforce the plastic wall 4.

The reinforcing element 42 is characterized by tapered end portions 44 which have a thickness D3 of 5 mm or less over an end portion length L1. The end portion length L1 is approx. 20 mm.

The reinforcing elements 38 and 42 also consist of HDPE in the present case.

In order to produce a fuel tank according to the invention, a plurality of reinforcing elements 8, 38 and/or 42 are arranged in a molding tool 46 (FIG. 5).

In the present case, the molding tool 46 is a blow mold, and so the reinforcing elements 8 and 38 shown are welded to the plastic wall when the plastic wall 4 is pressurized and molded within the blow mold 46. In the present case, the welding takes place from the shaping heat of a preform which has been extruded before the pressurization and introduction into the blow mold 46.

In the present case, the reinforcing element 8 sits on a ridge 48 which protrudes into a rear receptacle 50 of the reinforcing element 8 (see FIG. 2), so that the reinforcing element 8 can be enclosed on three sides by the molded plastic wall 4 as shown in FIG. 2. Accordingly, the ridge 48 is bordered on two sides by the side flanks 31 of the reinforcing element 8 and is delimited from a mold cavity 52 of the molding tool 46.

Figure 6:
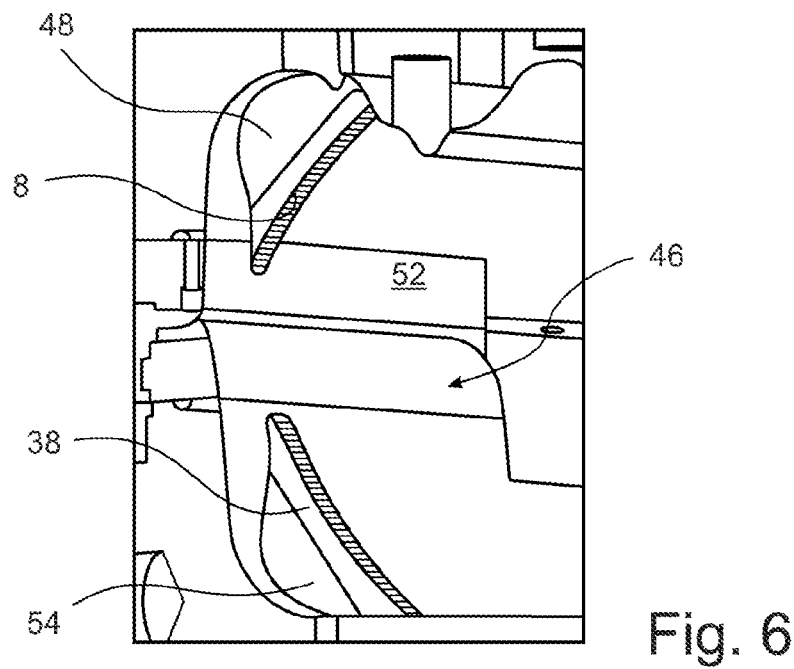
FIG. 6 shows a blow molding tool with inserted reinforcing elements.
Figure 7:
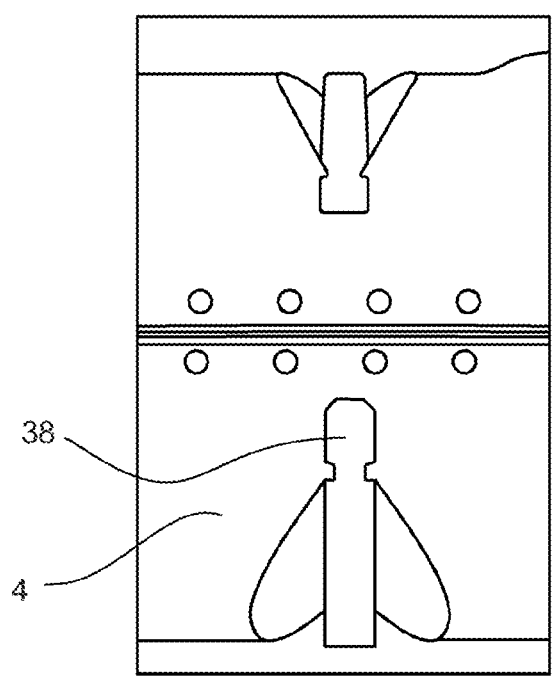
FIG. 7 shows a reinforcing element on a plastic wall.

In contrast, the reinforcing element 38 (FIG. 6) is held between two mold inserts 54, of which only one mold insert 54 can be seen in the illustration shown. The mold inserts 54 border the reinforcing element 38 in portions on two sides opposite the mold cavity 52, so that the reinforcing element 38 is integrated into the plastic wall 4, as shown by way of example in FIG. 7.

Figure 8:
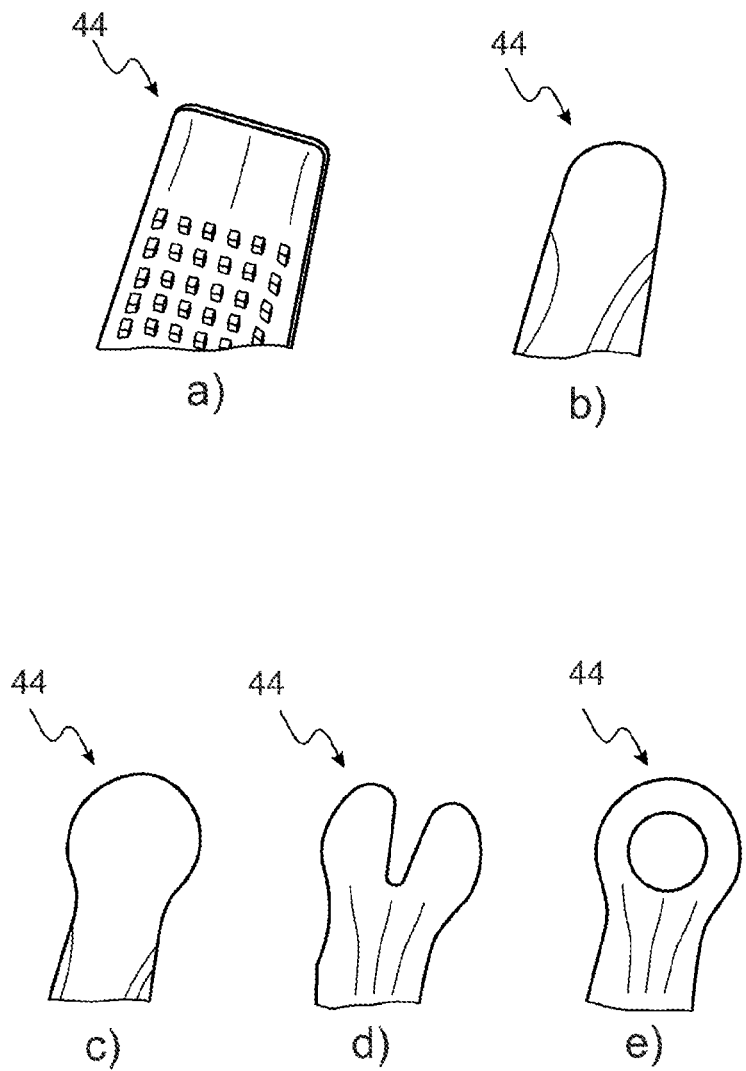
FIG. 8 shows variants of end portions of a reinforcing element.

With reference to FIG. 8, different variants for the shaping of the end portions 44 are disclosed in the following. Variant a) shows an end portion 44 according to FIG. 5, which has simply been tapered with respect to an adjoining central middle portion of the relevant reinforcing element 42.

FIG. 8 shows, in variant b), an embodiment of an end portion 44 which has a rounding in order to reduce the loads in the connection region to the plastic wall.

According to variant c), FIG. 8 shows an end rounding that has been additionally widened.

FIG. 8 shows, in variant d), an embodiment of the end portion 44 which is widened with respect to the adjoining central portion of the reinforcing element and which is also fork-shaped.

FIG. 8 shows, in a variant e), an end portion 44 which has a through-opening or perforation.

All of the aforementioned embodiments or variants of end portions 44 serve to reduce stress peaks in the connection region of the end portions to the wall.

Figure 9:
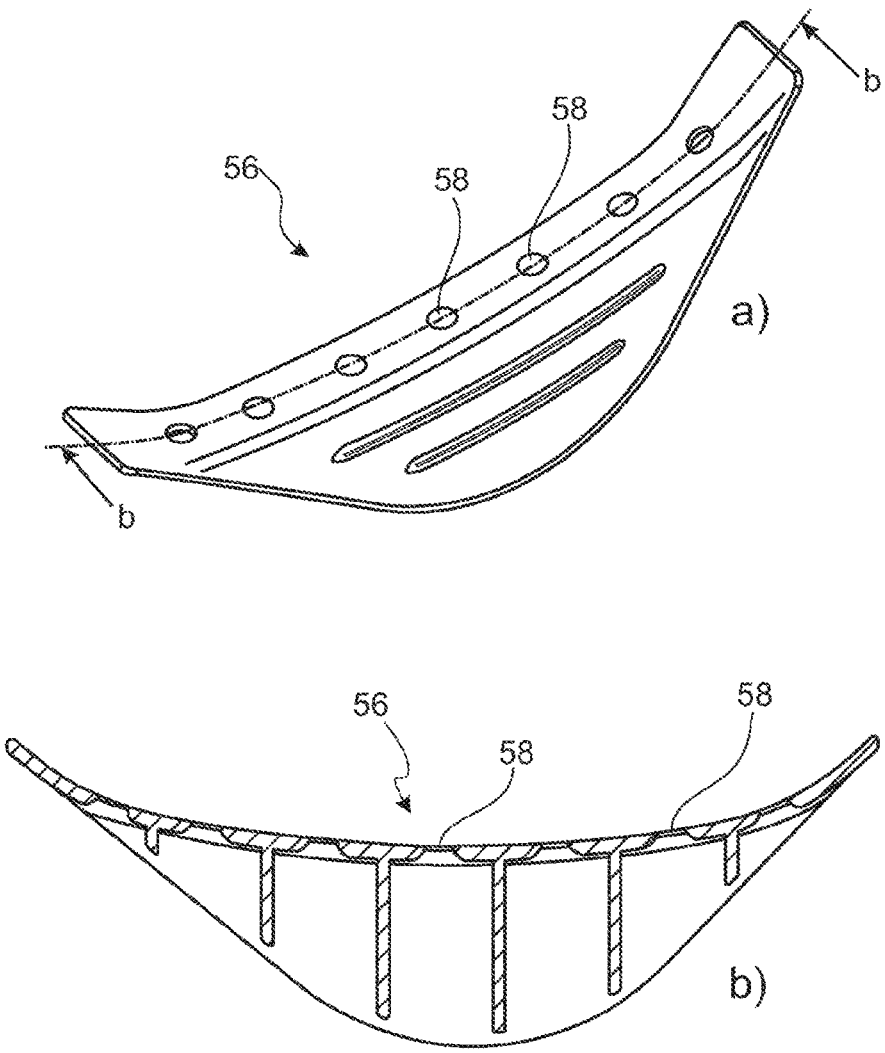
FIG. 9 shows a further reinforcing element.

FIG. 9 shows a further variant of a reinforcing element 56 according to the invention in a perspective view from above (FIG. 9a) and a longitudinal section (FIG. 9b). The reinforcing element 56 differs from the variants disclosed above in that a plurality of through-openings 58 are formed in the reinforcing element 56, which openings are penetrated by the material of the plastic wall in the shaping heat of the plastic wall when connecting the reinforcing element 56 to a plastic wall, resulting in rivet-like connections between the relevant plastic wall and the reinforcing element 56 which are formed by the cooled material extending into an interior space of the reinforcing element 56 and engaging the through-opening 58 laterally from behind, so that form-fitting, non-destructively detachable connections are formed.

FIGS. 10a, 10b and 10c show a further variant of a reinforcing element 60 according to the invention that differs from the variants disclosed above in that it is formed in a two-component design. The reinforcing element 60 has a first plastic component 62 and a second plastic component 64 which, as can be seen from the sectional views according to FIGS. 10b) and 10c), are interconnected in an integrally bonded and form-fitting manner.

With reference to FIGS. 11a, 11b and 11c, types of connection between a reinforcing element and an associated plastic wall are shown, with the sectional view being selected analogously to the variant according to FIG. 2.

FIG. 11a) shows, similarly to FIG. 2, a reinforcing element 66 which has form-fitting connections 68 and an integral bond 70 to an associated plastic wall 72.

FIG. 11b) shows a reinforcing element 74 with a plastic wall 76, with lateral integral bonds 78 and an end integral bond 80 being formed between the reinforcing element 74 and the associated plastic wall 76.

FIG. 11c) shows a variant of a connection between a reinforcing element 82 and an associated plastic wall 84, the reinforcing element 82 having welding pins 86 which are arranged at the end and also having welding pins 88 which are arranged in recesses 90.

In this way, an integral bond 90 can be formed at the end and an integral bond and a form-fitting connection 94 can be formed laterally.

FIG. 12 shows three variants of possible cross-sectional shapes of reinforcing elements, with variants a) and b) each showing trapezoidal cross sections of a reinforcing element 96 or 98 that is enclosed by a respectively associated wall 100, 102. According to FIG. 12c), a reinforcing element 104 is substantially rectangular in shape when viewed in cross section and enclosed on three sides by the associated wall 106.

FIG. 13 shows a variant of a reinforcing element 8 in a central section, the reinforcing element 8 having a substantially triangular shape in the transverse direction.

A plurality of grooves 36 are arranged on both sides of the wall of the reinforcing element 8, which grooves allow a form-fitting connection between the reinforcing element 8 and the designated fuel tank (not shown) connected to the reinforcing element 8.

On the side facing away from the designated wall connected to the fuel tank, plastic components 64 are provided for stiffening the reinforcing element 8.

A plurality of welding pins 34, which are also designed for connection to the fuel tank (not shown), are arranged on the upper side of the reinforcing element 8.

FIG. 14 shows a reinforcing element 38 which likewise has a substantially triangular cross section in the longitudinal direction.

In addition to the grooves 36 and the welding pins 34, the reinforcing element also has two blind holes 116 which are designed for being gripped by means of a gripper.

The reinforcing element 38 can be securely gripped, positioned and released again by a gripper (not shown) by means of the blind holes 116.

In particular, the reinforcing element 38 can be reproducibly positioned and optionally also fixed by a gripper (not shown) within a mold (not shown) by means of the blind holes 116.

FIG. 15 shows a further reinforcing element 38 which, in addition to the grooves 36 and the welding pins 34, has a plurality of depressions 40, the depressions 40 being designed as through-holes.

The depressions 40 allow a form-fitting connection to the designated fuel tank (not shown) and are also suitable as a vent, so that the plasticized plastic can optimally penetrate into the depressions 40 designed as a through-hole without counter pressure.

FIG. 16a is a detailed view of a molding tool 46 with a latching element 110 in the form of an internal spring (not shown) with a pressure body (not separately identified) designed as a ball (not separately identified).

The latching element 110 allows a reinforcing element 8 to be fixed in a simple and positionally precise manner within the molding tool 46.

FIG. 16b shows a molding tool 46 having a latching element 110 as well as a reinforcing element 8 fixed with the latching element 110 on the molding tool 46.

REFERENCE SIGNS

2 Fuel tank
4 Plastic wall
6 Storage volume
8 Reinforcing element
10 Outer side
12 Half-shell
14 Half-shell
16 Side wall
18 Weld seam
20 Tank top
22 Tank bottom
24 Transition
26 Transition
28 Region
30 Connection region
32 Ribbing
34 Welding pin
31 Side flank
36 Groove
38 Reinforcing element
40 Depression
42 Reinforcing element
44 End portion
46 Molding tool
48 Ridge
50 Receptacle
52 Mold cavity
54 Mold insert
56 Reinforcing element
58 Through-opening
60 Reinforcing element
62 Plastic component
64 Plastic component
66 Reinforcing element
68 Form-fitting connections 68 and
70 Integral bond
72 Plastic wall
74 Reinforcing element
76 Plastic wall
78 Integral bonds
80 Integral bond
82 Reinforcing element
84 Plastic wall
86 Welding pins
88 Welding pins
90 Recesses
92 Integral bond
94 Form-fitting connection
96 Reinforcing element
98 Reinforcing element
100 Wall
102 Wall
104 Reinforcing element
106 Wall on three sides
110 Latching element
116 Blind hole
H1 Height
D1 Thickness
D2 Wall thickness
D3 Thickness

The invention claimed is:

1. A reinforcing element for fuel tank for a motor vehicle, wherein the reinforcing element has at least one blind hole, which is designed for being gripped with a gripper, wherein the fuel tank comprises a plastic wall that delimits a storage volume for storing fuel, wherein the reinforcement element is configured to be connected to an outer side of the plastic wall that faces away from the storage volume at a connection region, wherein a maximum thickness of the reinforcing element, when measured normal to the plastic wall, exceeds a wall thickness of the plastic wall, and wherein the reinforcing element is arranged in a transition selected from the group consisting of a transition from a side wall to a tank top and a transition in front of a side wall to a tank bottom, wherein the reinforcing element is tapered on two sides starting from a region of the maximum thickness.

2. A fuel tank for a motor vehicle, the fuel tank comprising
a plastic wall, which delimits a storage volume for storing fuel, and
one or more reinforcing elements for reinforcing the plastic wall, the one or more reinforcing elements comprising at least one reinforcing element,
wherein the at least one reinforcing element is connected to an outer side of the plastic wall that faces away from the storage volume,
wherein a maximum thickness of the at least one reinforcing element, measured normal to the plastic wall, is greater than a wall thickness of the plastic wall,
wherein the at least one reinforcing element is arranged in a transition selected from the group consisting of a transition from a side wall to a tank top and a transition in front of a side wall to a tank bottom,
wherein the reinforcing element is tapered on two sides starting from a region of the maximum thickness, and
wherein the at least one reinforcing element has a substantially triangular or crescent-shaped basic shape.

3. The fuel tank of claim 2, wherein the plastic wall has a first half-shell and a second half-shell that are circumferentially welded to one another in a region of the side wall, the first half-shell being an upper shell that comprises the tank top and the second half-shell being a lower shell that comprises the tank bottom.

4. The fuel tank of claim 2, wherein the at least one reinforcing element has at least one tapered end portion that has a thickness of 5 mm or less over an end portion length of 20 mm or less and that is tapered in a wedge shape.

5. The fuel tank of claim 2, wherein an end connection region of the at least one reinforcing element is at least partially or completely arch-shaped and wherein the at least one reinforcing element is connected to the plastic wall in the connection region in an integrally bonded manner.

6. The fuel tank of claim 2, wherein the at least one reinforcing element is an injection-molded component with ribbing.

7. The fuel tank of claim 2, wherein the at least one reinforcing element is connected on three sides to the plastic wall and wherein an end face and two side flanks that adjoin the end face and face away from one another are integrally bonded to the plastic wall.

8. The fuel tank of claim 2, further comprising a form-fitting connection that is formed between the at least one reinforcing element and the plastic wall by an undercut.

9. The fuel tank of claim 2, wherein the at least one reinforcing element comprises HDPE.

10. The fuel tank of claim 2, wherein the at least one reinforcing element is embedded in a recess or depression in the plastic wall.

11. A method for producing the fuel tank of claim 2, the method comprising the following method steps: producing the plastic wall that delimits the storage volume for storing the fuel by introducing the plasticized plastic into a molding tool and
connecting one or more of the reinforcing elements to the plastic wall, the reinforcing elements being arranged on the molding tool before the plasticized plastic is introduced into the molding tool in such a way that at least one reinforcing element is connected to an outer side of the plastic wall that faces away from the storage volume,
wherein the maximum thickness of the at least one reinforcing element normal to the wall corresponds to the multiple of the wall thickness of the plastic wall.

12. The method of claim 11, wherein the molding tool is a blow mold and wherein the at least one reinforcing element is connected to the plastic wall in an integrally bonded and/or form-fitting manner by blowing over said at least one reinforcing element within the blow mold.

13. The method of claim 11, wherein the at least one reinforcing element comprises a plurality of welding pins or welding ridges on an end face or on a side flank that adjoins the end face in order to form an integral bond to the plastic wall when the plasticized plastic is introduced into the molding tool, the welding ridges being distributed in a grid-like manner or the welding pins-being provided in a punctiform manner in rows and columns at a connection region; and/or wherein the at least one reinforcing element has a groove, an undercut, or a projection in order to provide a form-fitting connection to the plastic wall when the plasticized plastic is introduced into the molding tool.

14. The method of claim 11, wherein at least one reinforcing element is connected to the plastic wall on three sides, wherein an end face and two side flanks, which adjoin the end face and face away from one another, are integrally bonded to the plastic wall,
the at least one reinforcing element, before the plasticized plastic is introduced, being seated on a mandrel or ridge of the molding tool, which protrudes into the reinforcing element and is bordered on two sides by the side flanks and is at least partially delimited from a mold cavity of the mold.

15. The method of claim 11, wherein at least one reinforcing element is connected to the plastic wall on three sides, wherein an end face and two side flanks, which adjoin the end face and face away from one another, are integrally bonded to the plastic wall, wherein the at least one reinforcing element, before the plasticized plastic is introduced, is received between two mold inserts, and wherein the mold inserts at least partially delimit the reinforcing element from a mold cavity of the molding tool.

16. The method of claim 11, wherein the at least one reinforcing element is fixed on the molding tool with a latching element during the introduction into the molding tool.

17. The fuel tank of claim 2, wherein the at least one reinforcing element comprises an end face and welding pins that are arranged on at least one of the end face and a side surface of the at least one reinforcing element that adjoins the end face.

18. The fuel tank of claim 2, wherein the at least one reinforcing element consists of HDPE.

19. The fuel tank of claim 2, further comprising a form-fitting connection that is formed between the at least one reinforcing element and the plastic wall by one groove.

20. The fuel tank of claim 2, wherein a height of the fuel tank measured between a tank top and a tank bottom of the fuel tank is thirty centimeters or more.

21. The fuel tank of claim 2, a plurality of reinforcing elements is provided on the plastic wall.

* * * * *